Jan. 26, 1926.

J. F. KELLER 1,571,169

DECAPITATING, CUTTING, AND CLEANING MACHINE

Filed March 22, 1921  6 Sheets-Sheet 1

Inventor-
John F. Keller.
by his Attorneys
Howson & Howson.

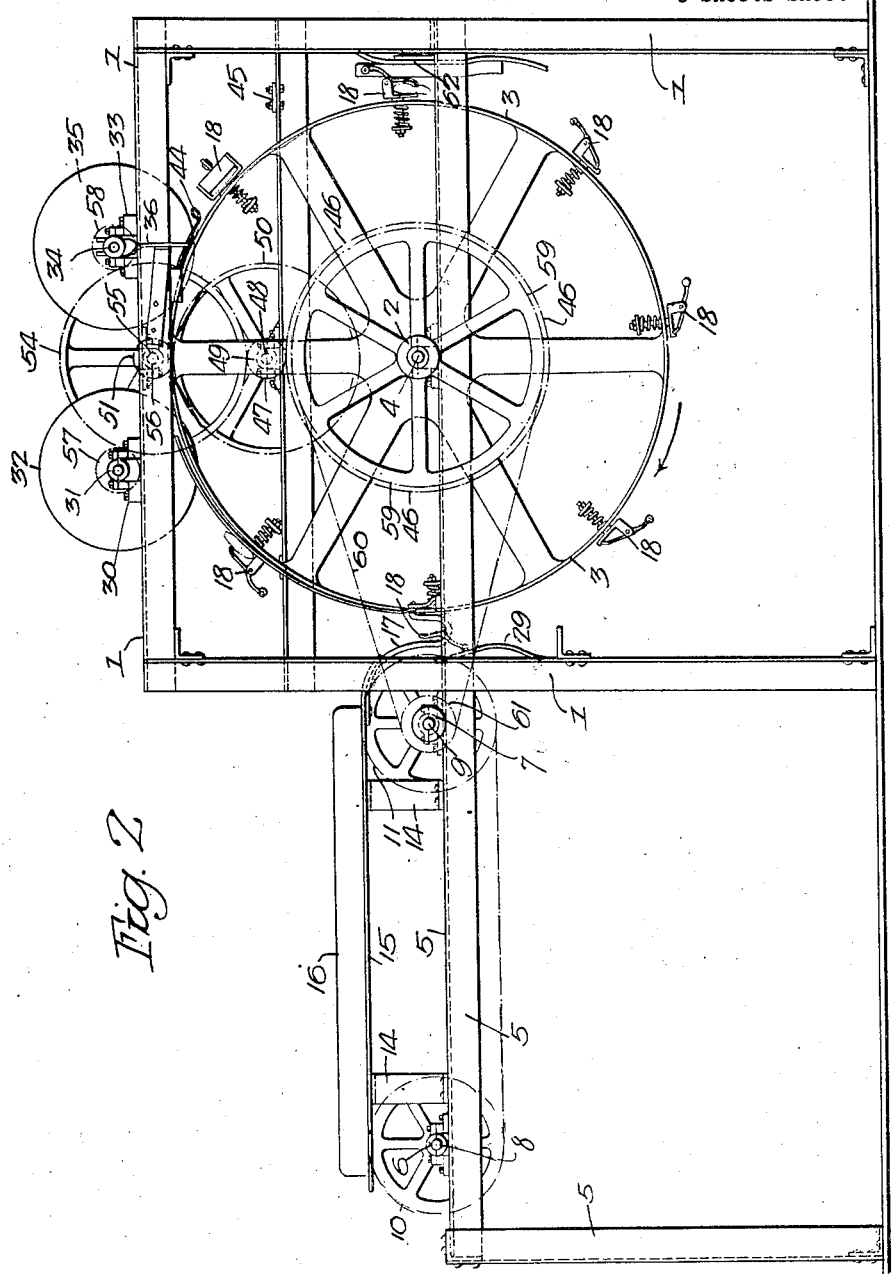

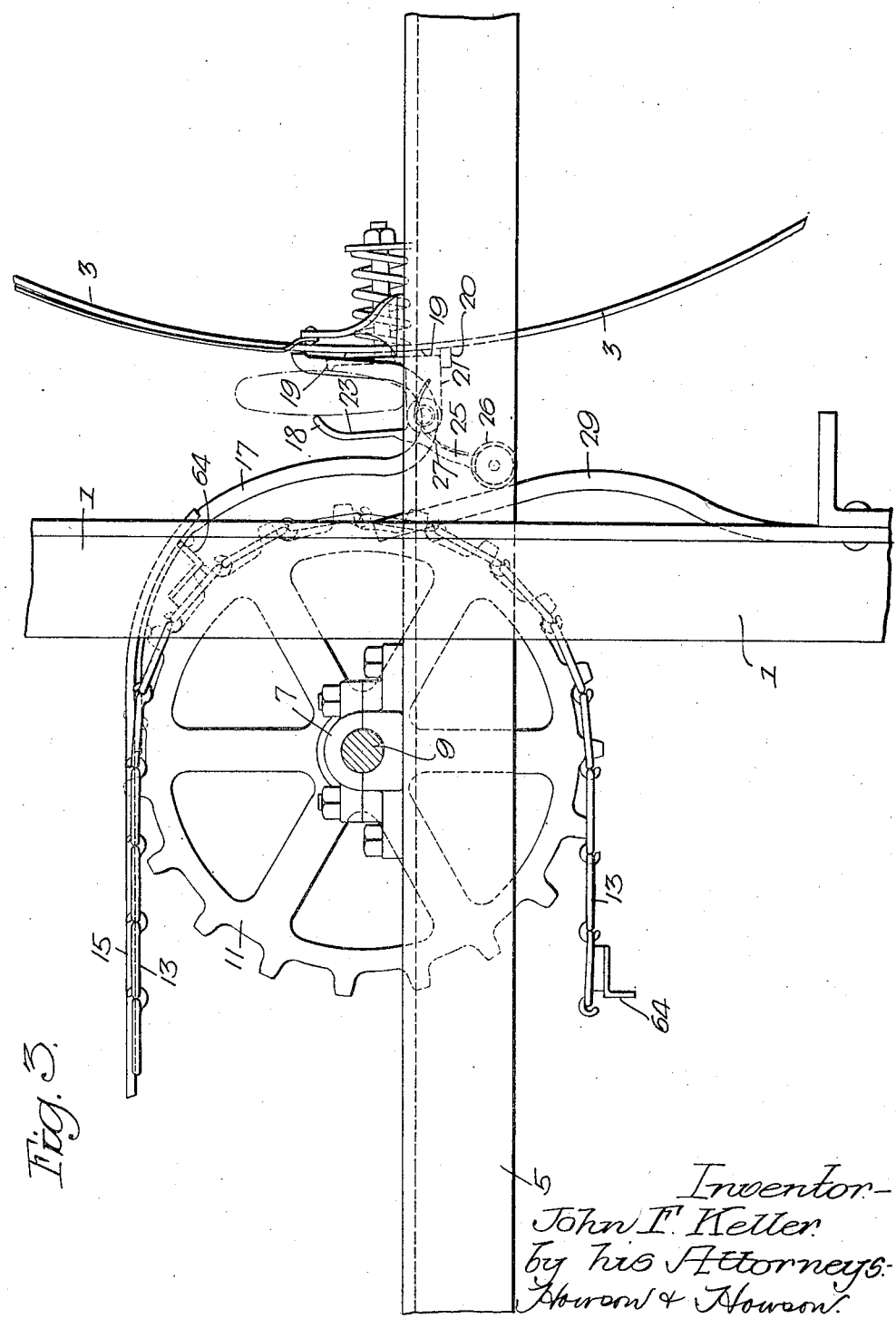

Jan. 26, 1926.
J. F. KELLER
1,571,169
DECAPITATING, CUTTING, AND CLEANING MACHINE
Filed March 22, 1921    6 Sheets-Sheet 4
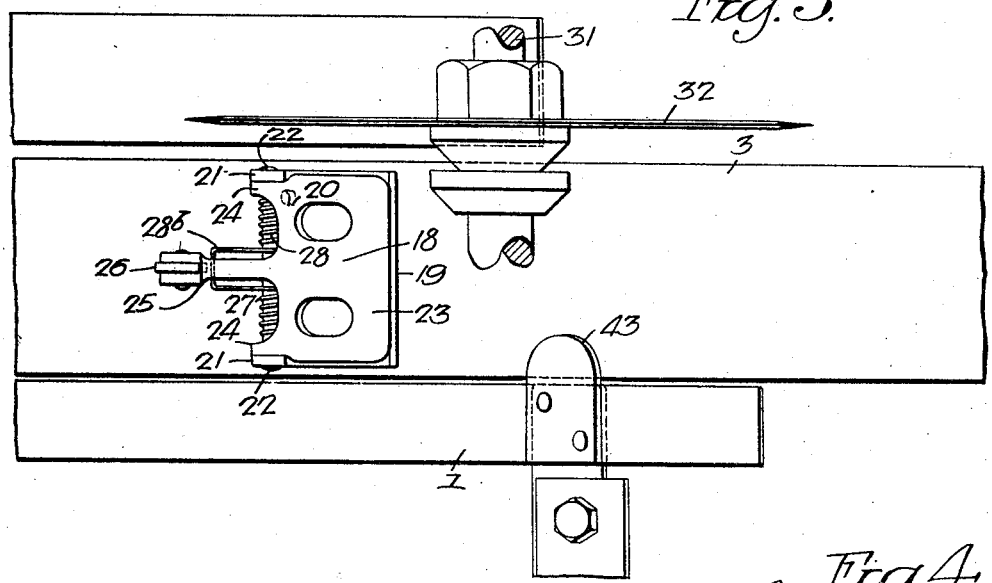
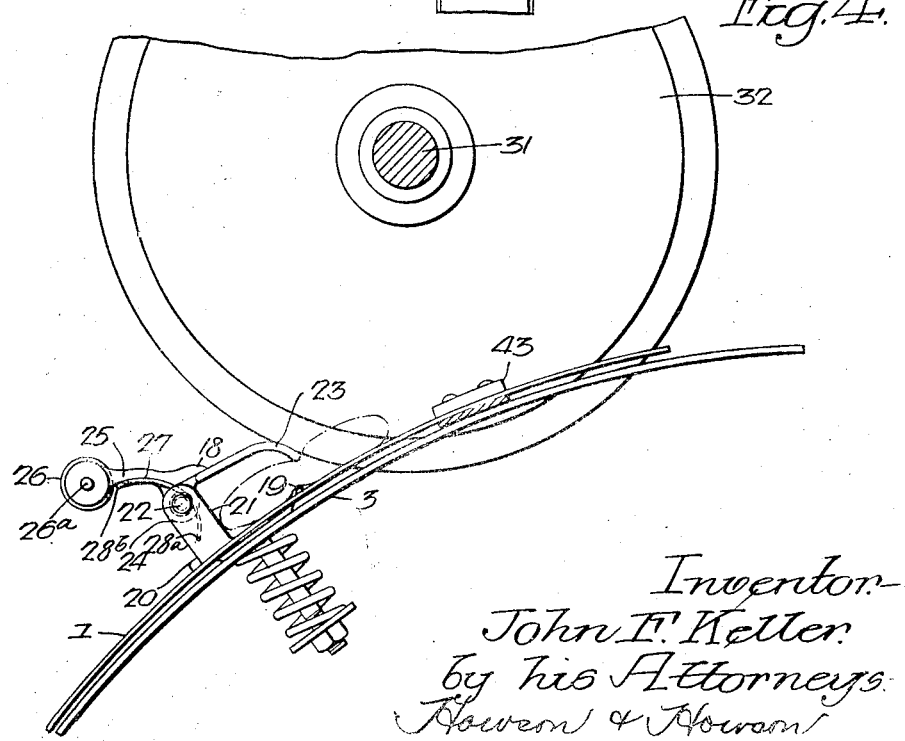
Inventor.-
John F. Keller.
by his Attorneys.
Howson & Howson

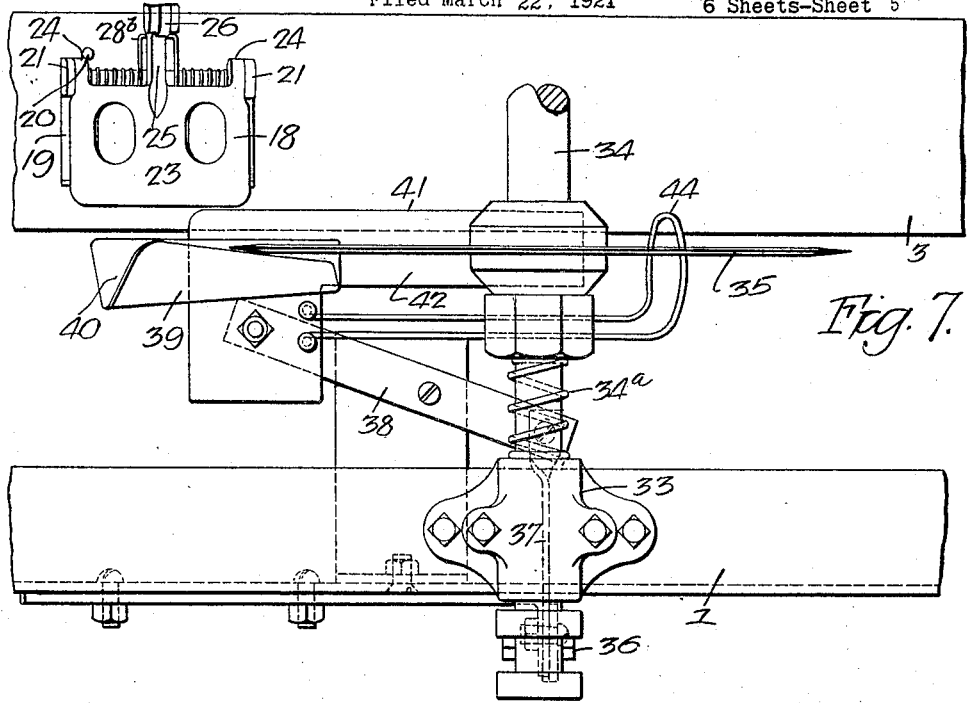
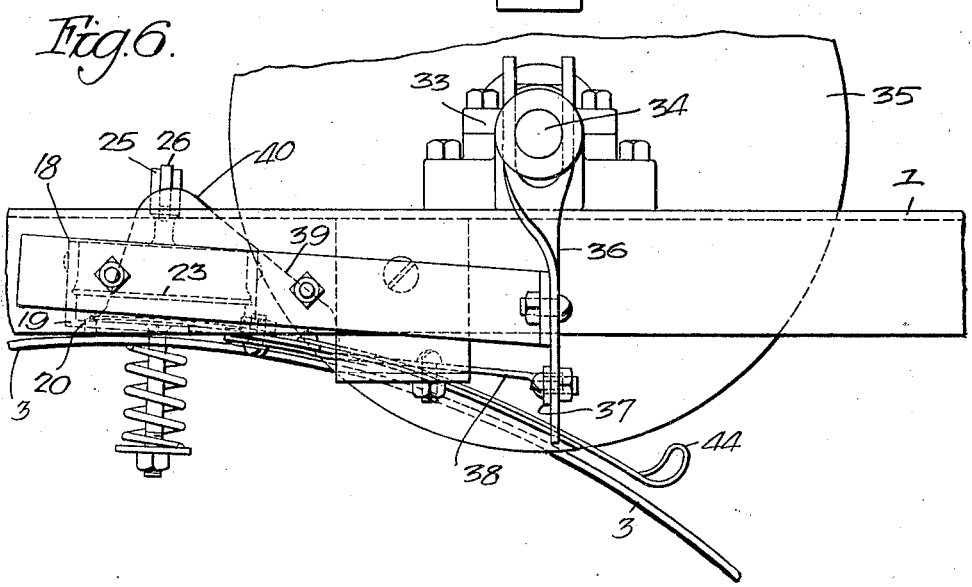

Jan. 26, 1926.
J. F. KELLER
1,571,169
DECAPITATING, CUTTING, AND CLEANING MACHINE
Filed March 22, 1921      6 Sheets-Sheet 6
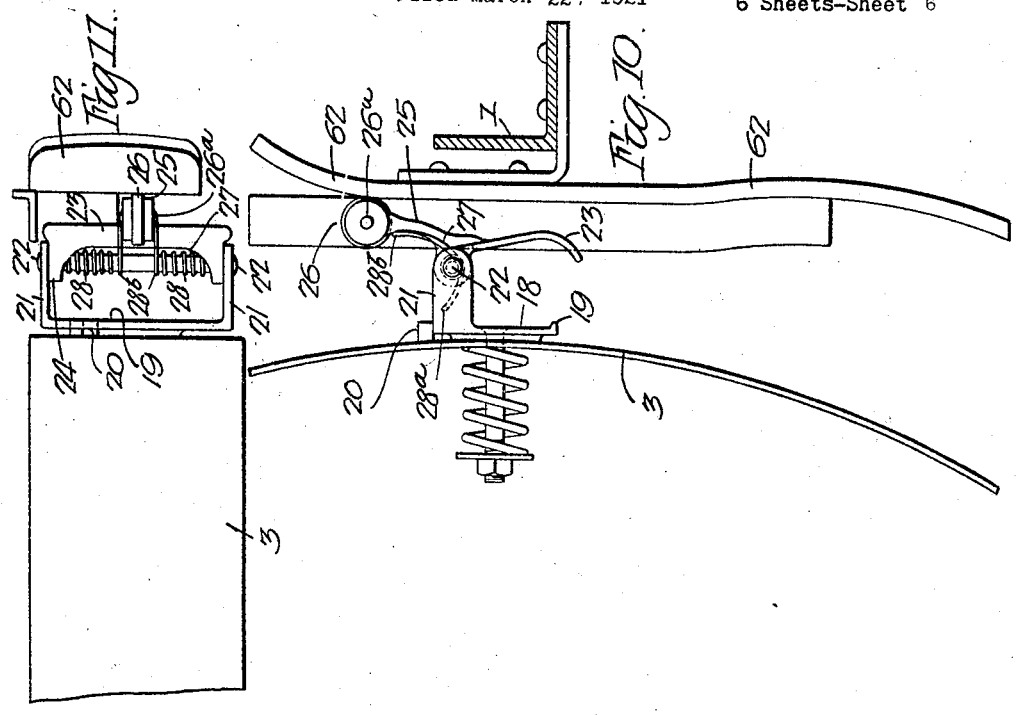
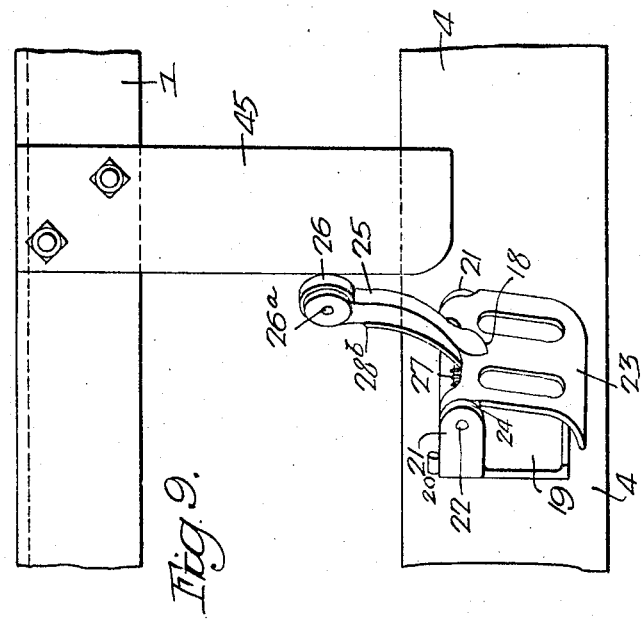
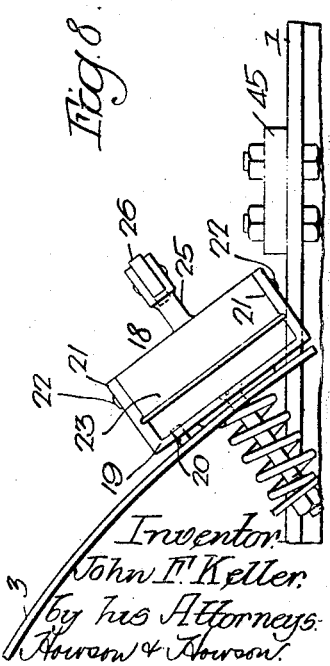
Inventor.
John F. Keller
by his Attorneys
Howson & Howson.

Patented Jan. 26, 1926.

1,571,169

UNITED STATES PATENT OFFICE.

JOHN F. KELLER, OF PHILADELPHIA, PENNSYLVANIA.

DECAPITATING, CUTTING, AND CLEANING MACHINE.

Application filed March 22, 1921. Serial No. 454,395.

*To all whom it may concern:*

Be it known that I, JOHN F. KELLER, a citizen of the United States, residing in Philadelphia, Pennsylvania, have invented certain Improvements in Decapitating, Cutting, and Cleaning Machines, of which the following is a specification.

My invention relates to fish cleaning machines, and more particularly to machines for cleaning herring, the object of the invention being to provide a machine which will automatically sever the head, together with a portion of the belly, will then clean out the entrails, and will finally deposit the cleaned fish in a suitable receptacle for easy removal from the machine.

A further object is to provide means whereby the severing of the head and belly portions is accomplished with accuracy, the amount of the belly removed being the same regardless of the size of the fish.

A still further object is to provide means for collecting the removed waste parts of the fish in piles or in suitable receptacles for easy disposal.

In the attached drawings:

Fig. 2 is a side elevation;

Fig. 3 is an enlarged side elevation of the feed end of the machine;

Figs. 4 and 5, are enlarged side elevation and plan view, respectively, of the head severing mechanism;

Figs. 6 and 7, are respectively enlarged side elevation and plan views of the belly and entrail removing means;

Figs. 8 and 9, are respectively a side elevation and plan view of the clamp centering means, and Figs. 10 and 11, are enlarged side elevation and plan views of the delivery end of the machine.

Figure 1:
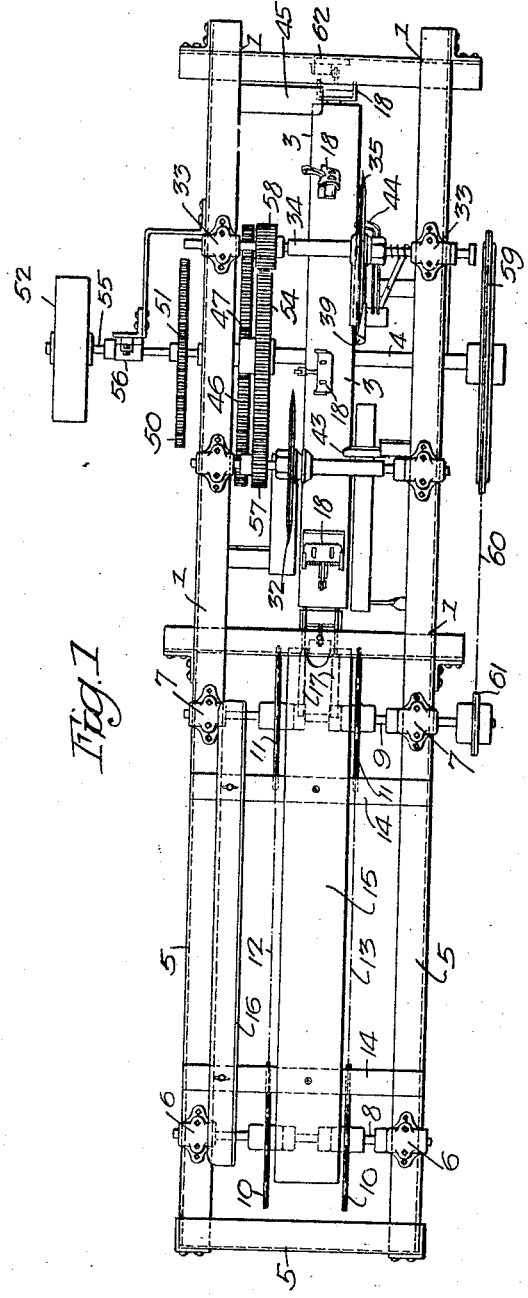
Fig. 1 is a plan view of my machine.

With reference to the drawings, the machine comprises a main frame 1 having suitable bearings, 2—2, in which is mounted, for rotation, a drum 3, said drum being mounted upon a shaft 4 carried in said bearings 2. Extending forwardly from the said main frame 1 is an extension 5 upon which are mounted in suitable bearings 6—6 and 7—7 respectively, shafts 8 and 9, upon each of which is mounted a pair of spaced sprockets, respectively 10—10 and 11—11, the sprockets of one pair being in alignment respectively with the sprocket of the other pair. Sprocket chains 12 and 13 extend around the aligned sprockets of each pair, said chains together forming an endless conveyor.

Also mounted upon the said frame 5 upon suitable supports 14 extending upwardly therefrom is a table 15, said chains 12 and 13 being adapted to move across the upper face of said table. The table has at one side an upwardly extending side wall 16, the purpose of which will be described hereinafter.

Suitably secured to the frame at a point slightly below the said sprockets 11—11 are a pair of hook-like members 17—17, said members constituting together a receptacle in which the fish carried towards the drum by the conveyor are deposited, said hooks being adapted to receive the fish as they pass off the end of the conveyor and to hold them in position to be engaged by suitable fish clamping elements 18 secured to the periphery of the drum.

The fish clamping elements are most clearly illustrated in Fig. 4 and consist of a base member or fan 19 which is pivotally secured substantially at its center point on the peripheral surface of the drum in such manner as to be capable of turning thereon, there being a suitable stop in the form of a projection 20 extending beyond the face of the drum which is so positioned as to limit the pivotal motion of the base member 19 to an arc approximately of 90°, the said base member in one position being adapted to lie laterally of the drum and in the other position circumferentially thereof.

The said base member 19 has extending upwardly at each side thereof a lug 21 in apertures in which is carried a spindle 22 which constitutes a pivotal support for an upper jaw 23, said element being in the present instance in the form of a substantially flat plate having lugs 24 through which the said spindle passes and having a rearward extension 25 forked at the end and carrying upon a pin 26$^a$ extending between said forks a roller 26. A spring 27 is provided which exerts a pressure tending to retain the forward end of the upper jaw down upon the lower jaw or base member 19, said spring in the present instance being in the form of a pair of connected coils 28 carried upon the pin and having end extensions 28$^a$ attached to the lugs 21, the portion 28$^b$ which extends between the coils being adapted to lie in back of or beneath the said extension of the clamping member and to bear thereagainst.

These clamping elements are secured to the periphery of the drum in the manner previously described and clearly illustrated in the drawings, and as the drum revolves, in the direction indicated by the arrow, the said clamping members, in a position extending laterally across the face of the drum, are carried consecutively toward the hooks 17—17. As the elements approach the position of the hooks 17—17, the roller 26 upon the extension 25 is brought into engagement with a cam element 29 secured to the frame 1, said cam acting to depress the arm 25 and thereby cause the opening of the jaws of the clamping member, the upper jaw 23 being lifted away from the base member 19. The continued movement of the drum carries the clamping element forward so that the back of the fish which is supported belly upward by the hooks 17—17 enters the jaws of the clamping element, after which the roller 26 is carried clear of the cam 29 and the spring 27 acts to clamp the member 23 upon the fish which is gripped firmly by the jaws.

Mounted in suitable bearings 30—30 at the top of the frame 1 is a shaft 31 which carries intermediate its end a circular saw or cutter 32, said cutter being disposed in a plane parallel to the plane of the drum and being so positioned with respect to the said drum that as the latter revolves a fish carried by the clamping member is carried into contact with the said cutter 32 in such a manner that the head is severed from the body.

Also mounted upon the frame 1 and carried in suitable bearings 33—33 thereon, is a shaft 34, said shaft carrying intermediate its ends a second rotary saw or cutter 35 also mounted in the plane of the drum. The said shaft 34 is adapted to be moved longitudinally in its bearings by a forked lever 36, pivoted to the frame 1, one of which is connected by a link 37 to a second lever 38, also pivoted to the frame 1 and having at its free end a gage or guard 39, the same being provided, first, to determine the amount of the belly to be removed from the fish, by moving the shaft 34 and the knife 35 away from the edge of the periphery of the drum the desired distance, and secondly, to support the belly of the fish while it is being severed by the knife 35. A spring $34^a$ confined between the knife 35 and one of the bearings 33 tends to keep the said knife in a neutral position adjacent the edge of the periphery of the drum 3. The gage or guard element is most clearly illustrated in Fig. 7 and consists of a substantially V-shaped member 40 disposed on its side with that end which lies in the direction from which the fish approaches flared so that the belly of the fish carried by the drum is guided between the sides of the element, the said guard also comprising a pair of arms which extend in planes parallel to the plane of the drum and towards the rear of the machine, between which arms 41 and 42 is disposed the blade of the cutter 35.

After the fish has been acted upon by the knife 32 and the head removed thereby, the tail end of the fish is carried into contact with a curved cam element 43 which projects inwardly from the side of the frame 1 over the said drum, this cam acting to rotate the clamping member together with the fish through an angle of approximately 90°, whereby the belly of the fish is presented to the side of the drum and is carried into the guard member 39. To an extent dependent upon the amount of the fish which projects beyond the forward edges of the clamping member, this guard 39 is forced outwardly against the tension of the spring $34^a$ by contact with the fish, thereby shifting outwardly with it the shaft 34 together with the cutter blade 35 so that the amount that is cut off by the cutter from the fish is in every case not greater than the depth of the guide member 39, thus insuring a substantially uniform cut in each case, irrespective of the size of the fish.

Extending inwardly from the frame 1 at a point just rearwardly of the cutter 35, is a spoon-shaped scraping element 44, said member lying in a position to enter the incision at the neck so as to scrape out the entrails. After completion of this operation, the side of the rear extension of the upper jaw of the clamping element is brought into engagement with a cam 45 similar in form and purpose to the cam 43, but disposed upon the opposite side of the drum, whereby the clamping member is again rotated through an angle of 90° and put in its original position laterally of the face of the drum. After the fish has been acted upon by the spoon 44 and after the cam 45 has acted upon the clamp to rotate it back to its original position, the continued rotation of the drum carries the rear extension of the clamping member with its roller into engagement with a cam 62 secured to the frame 1, this cam acting to again open the jaws of the clamp element to release the fish which falls downwardly into a suitable receptacle in the bottom of the frame, (not shown).

There is also provided at points beneath the cutters 32 and 35 and the spoon 44, suitable slideways which receive the severed and separated portions of the fish and which conduct them outwardly to suitable outlets at the side of the frame, the trash being thus collected in piles or in receptacles for easy disposal.

Upon the shaft 4 is a gear wheel 46, said wheel meshing with a pinion 47 upon a shaft 48 which is carried in suitable bearings 49—49 on the main frame 1, said shaft 48 having a gear wheel 50 secured thereto and meshing with a pinion 51 secured to a shaft 55 carried in bearings 56 on the frame 1, said shaft extending beyond one side of the frame and having a pulley wheel 52 secured to its outer end, the same being connected in suitable manner with an electric motor or other suitable driving means (not shown). A gear wheel 54 rigidly mounted upon the shaft 55 meshes with pinions 57 and 58 upon the shafts 31 and 34 respectively, whereby the said cutters 32 and 35 receive their rotary motion, the pinion 58 being made sufficiently wide to accommodate the longitudinal movement of the shaft 34 in its bearings. Carried upon the end of the shaft 4 is, in the present instance, a sprocket wheel 59 which is connected by means of a sprocket chain 60 with a sprocket 61 upon the shaft 9 whereby the motion of the driven shaft 4 is transmitted to the sprockets 11—11 and to the chains 12 and 13 which constitute the endless carrier.

The operation of the device is as follows: The fish are deposited by hand upon the conveyor as it passes over the table 15, the fish being in the present instance placed upon the chain laterally with the mouth against the back board 16 of the table 15 which acts as a stop to insure a position of the fish upon the conveyor such that the fish will be deposited in the hooks 17—17 in a proper position to be grasped by the clamping members 18 and passed to the rotary knife 32 for the severing of the head.

In order that the fish may be deposited in the hooks 17—17 at proper intervals to be taken hold of by the clamp elements 18 as they turn with the drum, I preferably make the chains 12 and 13 equal in length to the circumference of the drum, and there are extending between the chains 12 and 13, a series of outwardly extending blades 64, which blades are spaced apart upon the chain at substantially the same distances as the distance between the clamping members 18 upon the drum, and furthermore, these plates 64 are so disposed that the fish, which are placed upon the chains with their bellies abutting the blades, will be deposited upon the hooks 17—17 at exactly the right moment to be acted upon by one of the clamps 18, while not interfering with the movement of the preceding clamp.

As the fish is seized by the clamp and lifted from the hooks 17, it is carried upwardly until the knife 32 operates upon it to sever the head, which drops down a chute and is deposited at one side of the machine. The fish is then turned so that it lies circumferentially of the drum in order that its belly may be presented to the guard member 39, and continued rotation of the drum causes the knife 35 to operate upon the fish to sever a specified amount of the belly portion, which severed portion drops into a chute and is carried downwardly to one side of the machine. The fish is next acted upon by the spoon 44 which cleans out the entrails, which enter a chute, and is thereafter rotated with the clamping member to lie laterally across the face of the drum, and when thereafter the clamping member is brought into contact with the cam 62, it is released and is deposited in a receptacle, which when full may be removed and replaced by an empty one.

I claim:

1. In a fish cleaning machine, the combination of a continuously rotating drum, fish clamping means carried by said drum, means for severing the head of the fish and a portion of the belly as it is carried around by the drum, means for cleaning the entrails from the fish, and means for releasing the fish from the said clamping means after it has been acted upon by the said severing and cleaning devices.

2. In a fish cleaning machine, the combination of a continuously rotating drum having at the periphery thereof spaced clamping elements, feeding means operating to feed fish to said clamping elements while the drum is rotating, and means adapted to act upon the fish as the drum rotates for severing the head, a portion of the belly and for scraping the entrails from said fish.

3. In a fish cleaning machine, the combination of a revolving drum, fish clamping elements attached to said drum at spaced points around the periphery, feeding means operating to feed fish to said clamping elements while the drum is rotating, a pair of cutters located adjacent said drum, and means for presenting the head of the fish to one of said cutters and the belly of the fish to the other of said cutters as the drum revolves.

4. In a fish cleaning machine, the combination of a rotating drum, a series of fish clamping elements pivotally secured to the periphery of said drum at spaced intervals therearound, means for introducing fish to said clamps, a pair of rotary cutters mounted adjacent the said drum, and means for turning said clamping members as the drum revolves to present the head and the belly to the respective cutters.

5. In a fish cleaning machine, the combination of a continuously rotating drum, fish clamping elements secured to the periphery of said drum at spaced intervals therearound, automatic means for opening the said clamps for the reception of fish and for permitting them to close when the fish has entered, means located adjacent the said drum for severing the head and a portion of the belly and for cleaning out the entrails as the drum revolves, and means acting upon said clamps to release the fish after said cleaning operations.

6. The combination in a fish cleaning machine, of a continuously rotating drum, fish clamping elements carried by said drum, feeding means operating to feed fish to said clamping elements while the drum is rotating, a cutter located adjacent said drum and adapted to operate as the drum revolves to cut off a portion of the belly of a fish presented thereto, and means for limiting the amount of the belly removed.

7. In a fish cleaning machine, the combination of a rotating drum, fish clamping elements carried by said drum, feeding means operating to feed fish to said clamping elements while the drum is rotating, and a cutter element disposed adjacent said drum and adapted to operate on fish retained by said clamping elements and to remove a portion of the belly thereof, said cutter being movably mounted and having attached thereto an element adapted to be engaged by the belly of the fish to govern the position of the cutter relative to the fish and thereby to limit the amount of the belly removed.

8. The combination in a fish cleaning machine, of a rotating drum, fish clamping elements carried by said drum, a cutting element movably mounted adjacent the drum, means whereby the belly of the fish carried by said clamping elements is presented to the said cutter for removal of a part thereof, a spring tending to retain said cutter in an advanced position, and means operatively connected with said cutter and adapted to be engaged by the belly of the fish to determine the position of the cutter relative thereto.

9. In a fish cleaning machine, the combination of a rotating drum, fish clamping elements pivotally mounted at the periphery of said drum and having a spindle extending through the circumferential shell of said drum, and a spring on said spindle confined between the under side of the said shell, and a spring rest on the end of the spindle and adapted to create a downward pressure of the clamping elements against the drum.

10. In a fish cleaning machine, the combination of an endless conveyor, a rotating drum, a series of evenly spaced end clamping elements carried by the drum, a receptacle adapted to receive fish from said endless conveyor, said receptacle being in the line of travel of said clamping elements, means for actuating said clamping elements to grip the fish and to remove them from the said receptacle, and a series of spaced marking elements carried by said conveyor, the space between said elements being substantially the same as the space between the adjacent clamping elements on the drum.

11. In a fish cleaning machine, the combination of a rotating drum, fish clamping elements carried by said drum, means for introducing fish to said clamping elements, a rotary cutter disposed at one side of the machine and adapted as the drum rotates to have the head of the fish presented to the edge thereof and to sever said head, a rotary cutter mounted at the opposite side of the drum from said first cutter, means for turning the fish through an angle of approximately 90° so that after the head is severed, the belly is presented to said second cutter and a portion thereof severed, a substantially spoon-like element adapted to enter the belly incision as the drum rotates to remove the entrails from the fish, and means for thereafter releasing the fish from the said clamping elements.

JOHN F. KELLER.